Sept. 27, 1955     N. F. HAWTHORNE     2,718,793
GEAR
Filed Sept. 8, 1952
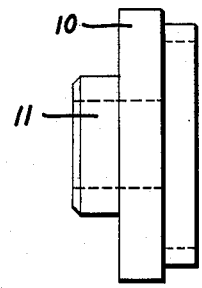
FIG_1
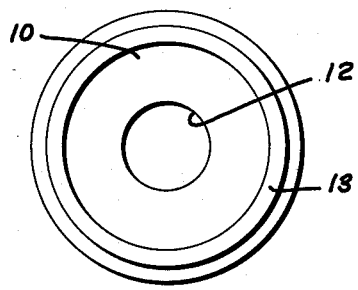
FIG_2
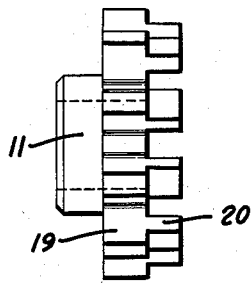
FIG_3
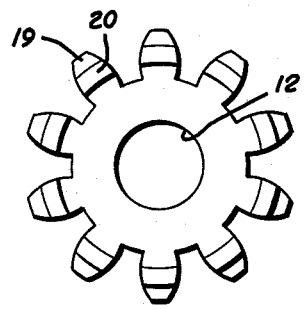
FIG_4
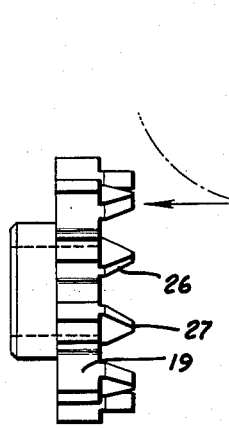
FIG_5
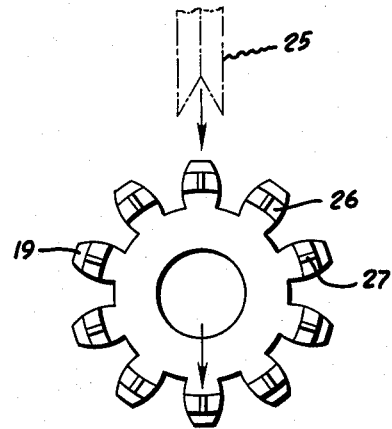
FIG_6
NATHANIEL F. HAWTHORNE
INVENTOR.
BY *Robyn Wilcox*
ATTORNEY

United States Patent Office 2,718,793
Patented Sept. 27, 1955

2,718,793
GEAR

Nathaniel F. Hawthorne, Alameda, Calif., assignor to Friden Calculating Machine Co., Inc., a corporation of California Application September 8, 1952, Serial No. 308,440

5 Claims. (Cl. 74—457)

This invention relates to an improved design for a gear which can readily be moved laterally into engagement with another gear, and in the economical manufacture of such a gear.

The principal object of the present invention is to provide improved gears suitable for use in calculating machines and the like, which are mounted on parallel shafts and are moved laterally into engagement with each other, and which must mesh readily and accurately. Normally such meshing must be before rotation of the driving gear, as such gears are used in gear trains in which the driving gear is given differential increments of motion depending upon a value to be entered. It is thus obvious that meshing must take place prior to the rotation of the differentially driven gear in order to accurately register the amount of such rotation. In the past it has been necessary, in machines of this type, to heavily detent both the driving and the driven gears so that they were held in the proper angular position for ready meshing. This problem has presented many difficulties, as the detents were noisy, required considerable power to overcome and generally were unsatisfactory. It can also be noted that in gears of this type, accuracy is extremely important, so that the gears have to be tight fitting in order to avoid inaccurate transfer of values from the differentially driven gear. My invention relates to a form of, and method of production of, a laterally slidable gear which readily engages its companion.

My invention will be more readily understood by a reference to the attached drawing in which:

Fig. 1 is a side elevation of a gear blank manufactured according to my invention.

Fig. 2 is a front view of the gear blank of Fig. 1.

Fig. 3 is a side elevation of the gear blank of Fig. 1, after the gear teeth have been cut in the conventional manner.

Fig. 4 is a front view of the gear shown in Fig. 3.

Fig. 5 is a side elevation of the completed gear of my invention.

Fig. 6 is a front view of the gear shown in Fig. 5.

In preparing the gear of my invention I start with a gear blank of the type shown in Figs. 1 and 2. It will be understood that this blank can be prepared by any conventional means such as stamping, casting, milling, or the like. It comprises a tooth blank 10 with an integral collar 11 and an internal bore 12. On the face of the gear which will lie adjacent the gear with which it is to mesh, I provide an annular shoulder 13. I have found that best results are secured if this shoulder has a width of approximately one-third to two-fifths of the whole depth of the tooth and lies substantially symmetrically on both sides of the pitch diameter. For example, I have found that very satisfactory results were secured in a gear having an outside diameter of .4 inch and a pitch diameter of .333 inch by using a shoulder having a width of .030 inch. In this particular case the height of the shoulder from the gear blank was .060 inch, although this height is not so important as the other relative sizes.

The next step in the prepartaion of the gear of my invention is to cut the teeth in the gear blank (and shoulder) in the conventional manner, to provide the gear shown in Figs. 3 and 4. In this step a conventional cutter, such as the cutter 18 shown in phantom line in Fig. 5, is moved parallel to the axis of the gear shaft to cut the teeth 19 in a conventional way, the teeth being of conventional size and design. When the gear is so cut, each tooth 19 has a square shoulder 20 lying substantially symmetrically about its pitch line, as shown in these figures.

The final step in the preparation of the gear of my invention is to cut sloping flanks on the ends of the shoulders (i. e., along the edge of the teeth of the gear). Preferably this is done by passing an inverted V cutter, such as shown in phantom lines 25 in Fig. 6, diametrically across the shoulders 20, on a ilne perpendicular to the axis of the gear shaft. This cutting provides sloping flanks 26 on the ends of the shoulders 20, as shown in Figs. 5 and 6. I have found that for all practical purposes it is satisfactory if the depth of the sloping flanks, in the gear above mentioned, was .050 inch, leaving a small perpendicular shoulder at the base, where the shoulder 20 joins the gear tooth 19 (as shown in Fig. 5); which shoulder can be (in the gear above mentioned) of the height of about .010. Such a cut would leave a flat top 27 on the top of each shoulder, which may be of a width of about .010 inch. I prefer that the angle of the sloping flanks 26 at the apex of the sloping flanks be about 55° or 60°, although angles of 45° have proven satisfactory, and there would be no objection to more acute angles than those mentioned.

The construction of the gear of my invention provides a finished gear having a tooth of conventional configuration and having a shoulder thereon perpendicular to the axis of the tooth and substantially equally disposed on the two sides of the pitch circle. The sides of the shoulder concentric with the pitch line are substantially perpendicular to the face of the gear, while the sides parallel to the axis of the tooth are sharply sloped to form an angular flank.

In machines of the type contemplated, the driven gear must be stopped in a differential position, usually by a strong detent, Geneva wheel and block, or the like. If the driven gear is held engaged until the driver is stopped, the latter will be located in the approximate meshing position (after the gears are unmeshed) and normally will be held in that position, for most such gear trains lead to a register dial which must be held in its adjusted position. However, by using my invention the detents can be much lighter, for it is unnecessary that the gears be accurately held in their angularly meshing position while disengaged. It will be obvious that as one gear of the type shown is moved laterally into the plane of its associated gear, which is also provided with the angular pilot teeth formed by the flanks 26 on the shoulder 20, the sloping flanks 26 of the two teeth will engage one another, thereby accurately positioning the two gears with respect to each other.

In this connection it can be mentioned that it is undesirable to widen the shoulders 20 to reach to the end of the teeth, as that would provide a knife edge or flat top 27 of a length such that the two edges on the respective teeth might lock. However, with the narrow shoulder here described, and with the formation of the lateral pilot teeth as herein specified, the laterally movable gear will easily and quickly mesh with the other, forming a perfect mesh even though the gears are cut to a close tolerance. With this invention the gear teeth can be accurately machined so as to avoid lost motion between the two gears, and thereby avoid the defect of a loose meshing of the gears, previously common in this art.

I claim:

1. A gear adapted for laterally meshing with another comprising a plurality of teeth, and a shoulder on the side of each tooth, each such shoulder having sloping flanks, being substantially symmetrically disposed along the pitch line of the tooth, and having a thickness of the order of about one-third to two-fifths the whole depth of the tooth.

2. In a gear of the type described having teeth of conventional configuration, a pilot means for enabling ready meshing with an associated gear upon lateral displacement into a common plane which comprises a shoulder on the side of each tooth, the longitudinal axis of the shoulder being substantially the pitch line of the tooth and having a thickness of the order of about one-third to two-fifths the whole depth of the tooth, the sides of the shoulder concentric with the pitch line being substantially perpendicular to the gear, and the ends of the shoulder being sloped at an angle of about 60° from the gear.

3. A gear of the type described comprising a plurality of gear teeth, a shoulder on the side of each tooth concentric with the pitch line of the tooth, the sides of said shoulder concentric to the pitch line of the tooth being substantially perpendicular to the side of the tooth, and the ends of said shoulder being inclined to form a sloping flank.

4. A gear adapted for laterally meshing with another comprising a plurality of teeth, a shoulder on the side of each tooth, said shoulders having side walls perpendicular to the sides of said gear teeth and concentric to the pitch line of the gear, and sloping flanks on the ends of said shoulders.

5. A gear adapted for laterally meshing with another comprising a plurality of teeth, a shoulder on the side of each tooth, said shoulders having side walls perpendicular to the sides of said teeth and concentric to the pitch line of the gear, sloping flanks on the ends thereof and a thickness of the order of about one-third to two-fifths of the whole depth of the tooth.

References Cited in the file of this patent

UNITED STATES PATENTS

| | | |
|---|---|---|
| 829,926 | Lipe | Aug. 28, 1906 |
| 1,380,286 | Anderson et al. | May 31, 1921 |
| 2,062,927 | Peterson | Dec. 1, 1936 |

FOREIGN PATENTS

| | | |
|---|---|---|
| 909,413 | France | Dec. 20, 1945 |